W. M. BURGETT.
ANIMAL TRAP.
APPLICATION FILED JAN. 5, 1917.
1,232,210.
Patented July 3, 1917.
2 SHEETS—SHEET 1.
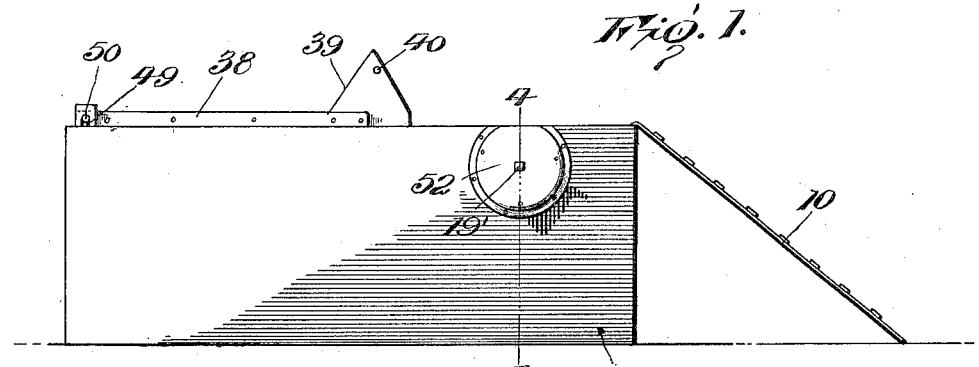
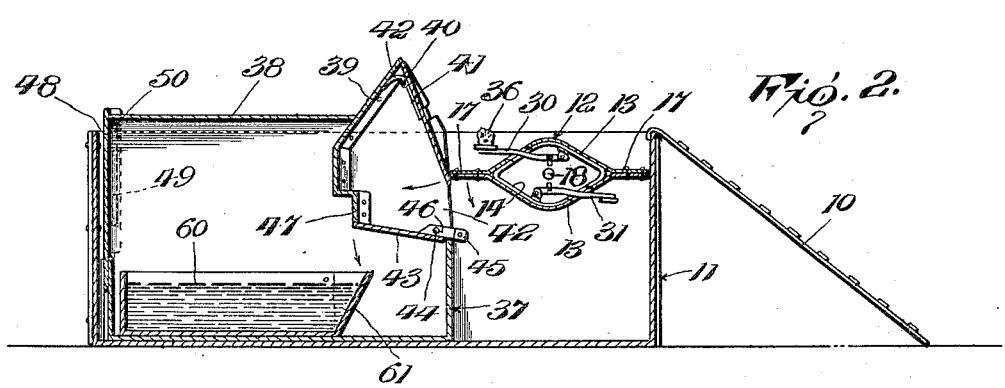
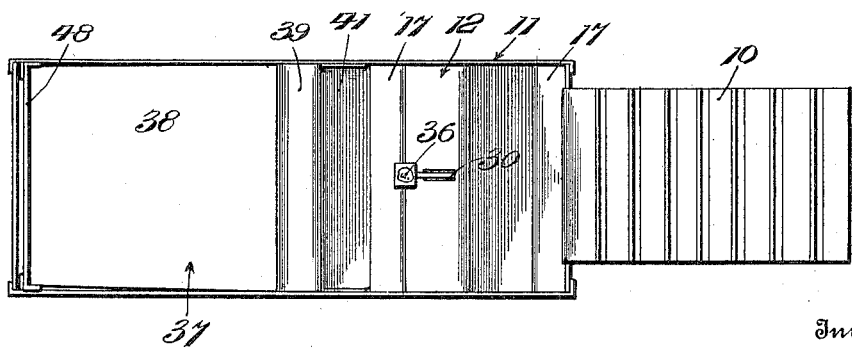
Witnesses
Inventor
W. M. Burgett.
By
Attorney

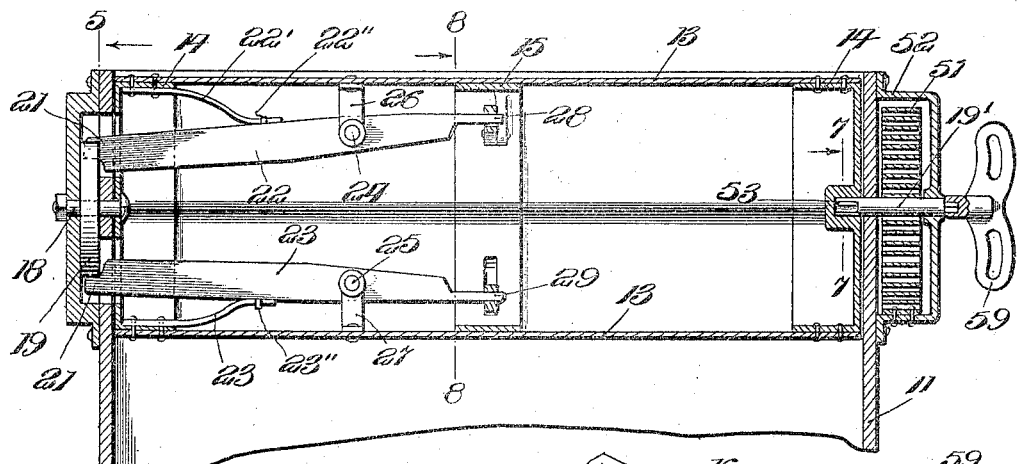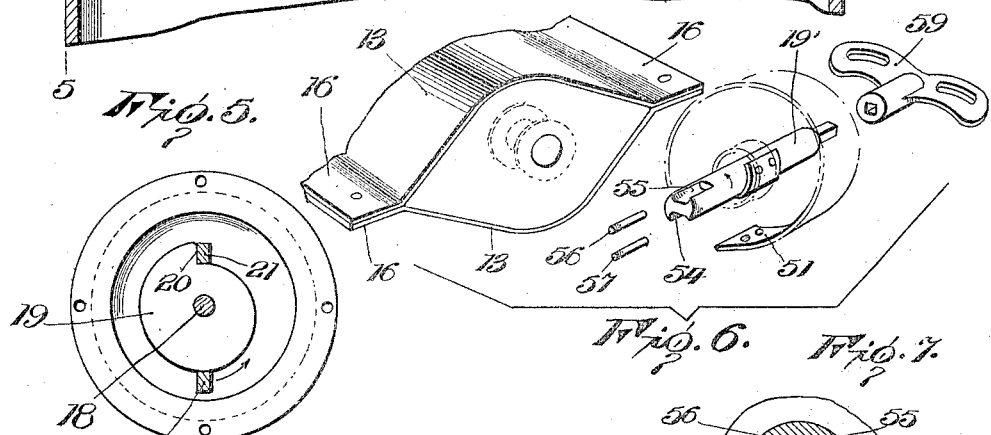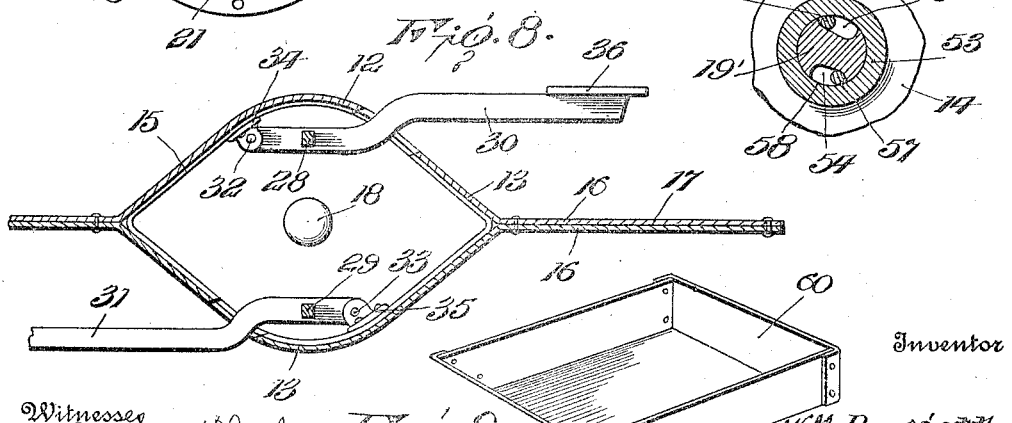

UNITED STATES PATENT OFFICE.

WILLIAM MATHEWS BURGETT, OF FLOYDADA, TEXAS.

ANIMAL-TRAP.

1,232,210.  Specification of Letters Patent.  Patented July 3, 1917.

Application filed January 5, 1917. Serial No. 140,763.

*To all whom it may concern:*

Be it known that I, WILLIAM MATHEWS BURGETT, a citizen of the United States, residing at Floydada, in the county of Floyd and State of Texas, have invented certain new and useful Improvements in Animal-Traps, of which the following is a specification.

This invention relates to animal traps, and more particularly to that type of such traps known in the art as "self and ever-set", and the invention has for its primary object the provision of a trap of the character set forth which shall be efficient of operation, economical of construction, and sanitary.

A further object of this invention is to provide a trap of the character set forth with means whereby an animal may be confined, or put to death, as desired by the operator of the trap.

A still further object of this invention is to provide a trap with removable means for confining the animal in order to permit of the easy removal of the animal from the trap.

With the foregoing and other objects in view as will appear from time to time hereinafter, this invention consists in the peculiar combination and arrangement of the various related parts of an animal trap as set forth in the following specification and more particularly pointed out in the appended claims.

Referring to the accompanying drawings forming a portion of this specification and illustrating a preferred embodiment thereof, and in which the same reference characters indicate the same parts wherever used:—

Figure 1 is a side elevation of the trap;

Fig. 2 is a vertical longitudinal section thereof;

Fig. 3 is a top plan view;

Fig. 4 is a detail section;

Fig. 5 is a section on line 5—5 of Fig. 4;

Fig. 6 is a detail perspective view showing certain parts in separated relation.

Fig. 7 is a section on the line 7—7 of Fig. 4;

Fig. 8 is a section on the line 8—8 of Fig. 4;

Fig. 9 is a detail perspective view.

The numeral 10 designates a run-way of any suitable character adapted to lead up to the open top of an oblong box member 11, which is provided at its upper end, near the end of the run-way 10, with a revolving trap door 12, which comprises two pieces 13—13, separated by headers 14—14, and a central spacing member 15, and having their overlapping edges 16—16 secured together in any suitable manner to form a relatively level portion 17. The headers 14—14 carry shafts 18 and 19', respectively, said shaft 19' being journaled in the side of the box member 11, the shaft 18 being non-rotatably mounted on the box member 11 and carrying a cam member 19 fast thereon and provided with a notch 20, adapted to normally receive the trigger end 21 of trip members 22 and 23, adapted to be normally held in bearing relation against the outer periphery of the cam disk 19, by means of leaf springs 22' and 23' fastened to the interior of the header 14 and bearing against the upper faces of the levers 22 and 23, respectively, and carrying guides 22'' and 23'' to assist in the operation thereof, the said trip members being journaled respectively at 24 and 25 to members 26 and 27, secured to the inner faces of the members 13—13, the members 22 and 23 being provided respectively with elongated portions 28 and 29, which in turn engage the carrying levers 30 and 31, respectively, pivotally mounted at 32 and 33 to ears 34 and 35, formed integral with the intermediate spacing member 15, and extending outwardly from the revolving trap door 12, where each of the levers 30 and 31 is provided with a suitable support 36 adapted to carry any suitable bait adapted to attract the animal thereto.

Within the box member 11 is placed a second box member 37, provided with a closed upper portion 38, and having an upwardly extending portion 39, in which is journaled at 40 a swinging door 41, adapted to be normally closed by means of a spring 42, the said member, when closed, being upon a line with the plane of the portion 17 of the revolving trap door 12, and in alinement therewith. Directly below the door 41, and separated therefrom by means of an open space 42, is a second door 43, pivotally mounted at 44 and adapted to be held normally closed by means of weights 45 carried by arms 46, which cause the door to be normally held in upward position against the member 47, which is an extension of the member 39.

The outer end of the box member 37 is provided with an upwardly sliding and outwardly swinging door 48, provided with slots 49 adapted to slide and pivot upon pivots 50, carried by the top 38 of the box member 37. The shaft 19' is fastened to one end of a coil spring 51 which is inclosed within the casing 62, upon the exterior of the box member 11, and the inner end of the shaft 19' extends into a bearing 53 formed in the header 14 and is provided with two cam slots 54 and 55, which incloses pins 56 and 57 free to slide within said cam slots in order to point against the interior wall 58 of the bearing 53 to cause the header 14, and consequently the trap door 12, to be bound together to cause them to turn under the action of the spring 51, which is wound by means of a key 59, and which operates in a manner to be hereinafter explained.

If desired, a pan 60 having an outwardly flaring end 61, may be filled with any suitable liquid and placed within the second box member 37 for a purpose hereinafter set forth.

The operation of the device is as follows:—

The spring 51 having been placed under tension by means of a key 59 operating the shaft 19', the pins 56 and 57 upon the winding operation of the shaft 19', fall backward within the slots 54 and 55 to permit freedom of movement for the winding operation of the shaft 19' and a suitable bait is placed upon both of the supports 56, whereupon an animal attracted thereby will ascend the member 10, and in order to reach the bait upon the member 36, must traverse the trap door 12, when upon seizure of the bait upon the supports 36, the lever 30 will be depressed, carrying therewith the member 28, which causes the lever 22 to pivot at 24 to raise the trigger 21 from out of the slot 20 of the cam disk 19, which will permit the trap door 12 under the action of the spring 51 to revolve until the second trigger 21 of the member 23 has engaged the slot 20 of the cam disk 19, thus permitting one-half of the complete revolution of the revolving trap door 12, which brings the second lever 31 carrying the bait support 36 into the same relative position as that of the lever 30 operated as just before stated. Upon a revolution of the trap door 12, the animal carried thereby will be thrown forcibly against the door 41, causing the same to open under the weight thereof, when the animal will drop upon the door 43, opening the same by overcoming the action of the weights 45 and falling into the liquid contained in the pan 60, where the animal is drowned.

When it is desired to remove the dead animal the second box member may be lifted bodily from the member 11, and the door 48 raised and opened outwardly by means of the slots 49 and the pivots 50, whereupon the pan 60 may be lifted out and the contents therein thrown away.

I realize that considerable variation of the specific details as herein set forth may be effected without departing from the spirit of my invention, and it is therefore not my intention to restrict myself to the construction herein shown and described, but to construe the following claims as broadly as the state of the prior art will permit.

Having thus described my invention, what I claim and desire to secure by U. S. Letters Patent, is:—

1. In an animal trap, a trap door comprising a plurality of headers, members inclosing said headers and provided with a plurality of engaging extensions, a shaft carried by one of said headers, a spring carried by one of said shafts, bait holding means, and means connected with said bait holding means adapted to control the operation of the spring.

2. In an animal trap, a rotatable trap door comprising a plurality of headers, door forming members carried by said headers, a shaft carried by one of said headers, a cam disk carried by a second shaft and provided with a stop, a plurality of trip members, one of which is always in engagement with said slot, a spring carried by said first mentioned shaft, and means carried by each of said trip members and extending to a point above the trap door floor to enable the animal to operate said trip lever.

3. In an animal trap, a rotatable trap door comprising a plurality of headers, door forming means connecting said headers, a shaft supporting one of said headers, a shaft carried by one of said headers, means carried by the second shaft adapted to rotate the trap door, and means carried by said first shaft adapted to control the rotation of the trap door.

4. In an animal trap, a rotatable trap door comprising a plurality of headers, door forming means connecting said headers, a shaft supporting one of said headers, a shaft carried by the other of said headers, means carried by the second shaft adapted to rotate the trap door, said means comprising a coil spring on said shaft, means for placing said spring under tension, and a one-way clutch between said shaft and said header.

5. In an animal trap, a rotatable trap door comprising a plurality of headers, door forming means connecting said headers, a shaft supporting one of said headers, a shaft carried by one of said headers, means carried by the second shaft adapted to rotate the trap door, means carried by said first shaft adapted to control the rotation of the trap door, said means comprising a cam disk having a stop, a plurality of trip members on the door adapted to engage said stop, means for holding one of said trip members in engagement with the stop, and means carried by the door adapted to be operated by an animal to release said trip members.

6. In an animal trap, the combination of a receptacle open on top at one end, an inclined rim way extending up to the opening in the top, a rotatable trap door mounted in the open portion of the receptacle, a fixed stop adjacent one end of the rotary trap door, a pair of pivoted levers mounted in the trap door, the ends of said levers being adapted to engage with the stop in the rotation of the trap door, baiting levers pivoted in the trap door and extended to opposite surfaces thereof, said baiting levers being operatively connected to the first mentioned levers, means for rotating the trap door when one of the baiting levers is operated, a swinging door adjacent the trap door and against which the animal is thrown to open the door when the trap door is opened, whereby to confine the animal within the receptacle.

7. In a trap, the combination with a receptacle open at the top at one end, a rotary trap door mounted in the opening in the receptacle, baiting levers extending from opposite sides of the trap door and extending in opposite directions, means associated with each baiting lever to hold the trap door in closed position, means for automatically rotating the trap door when one of the topmost baiting levers is depressed by an animal, an intermediate compartment adjacent the rear end of the trap door and in the receptacle, a swinging door in the front of the intermediate compartment adjacent the rear end of the trap door, whereby when an animal is thrown against the swinging door by the trap door said swinging door is opened, and a swinging door in the bottom of the intermediate compartment, the weight of an animal thereon opening the latter door and delivering said animal to the receptacle.

In testimony whereof I affix my signature in the presence of two witnesses.

WILLIAM MATHEWS BURGETT.

Witnesses:
LUTHER H. LISTON,
J. M. HUGHES.

Copies of this patent may be obtained for five cents each, by addressing the "Commissioner of Patents, Washington, D. C."